No. 794,157. PATENTED JULY 11, 1905.
H. A. BÖLZE.
HOT WATER HEATING SYSTEM.
APPLICATION FILED OCT. 21, 1904.

3 SHEETS—SHEET 1.

Witnesses:
E. O. Hildebrand
M. F. Anderson

Inventor:
Heinrich Athanasius Bölze
by Georgii Massie
Attorney

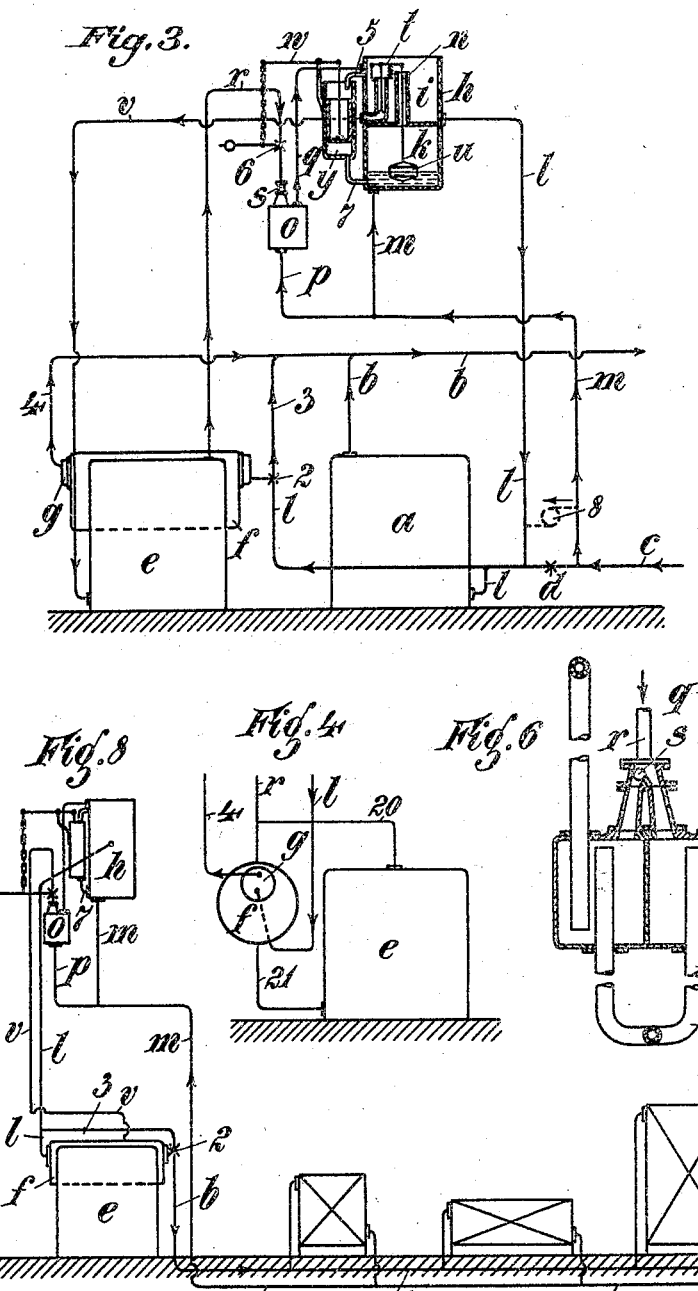

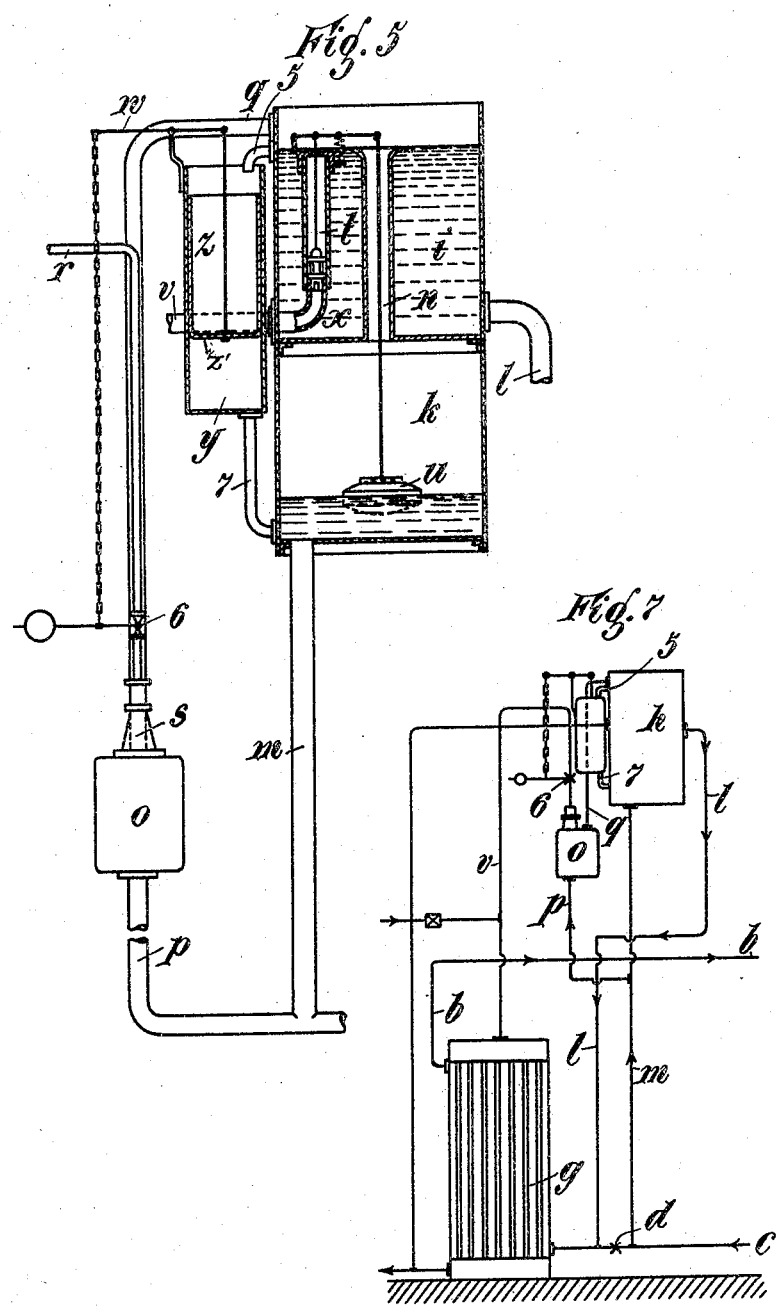

No. 794,157.

Patented July 11, 1905.

UNITED STATES PATENT OFFICE.

HEINRICH ATHANASIUS BÖLZE, OF HANOVER, GERMANY.

HOT-WATER HEATING SYSTEM.

SPECIFICATION forming part of Letters Patent No. 794,157, dated July 11, 1905.

Application filed October 21, 1904. Serial No. 229,464.

*To all whom it may concern:*

Be it known that I, HEINRICH ATHANASIUS BÖLZE, engineer, a subject of the Emperor of Germany, residing at No. 8 Nienburgerstrasse, Hanover, in the German Empire, have invented certain new and useful Improvements in Hot-Water Heating Systems, of which the following is a specification.

This invention relates to a hot-water heating system in which the hot water in its course receives a regulated constantly-uniform excess of pressure, so that a lively but nevertheless regulated circulation of the hot water is achieved independently of the level of the source of heat (boiler or preheater) in respect of the radiator. This action is obtained by arranging above the highest point of the heating system instead of the closed expansion vessel now usual two open vessels, of which the one stands higher than the other, the upper vessel being connected with the outflow, while the lower is connected with the return-flow of the system. When water flows into the upper vessel, it passes first into the outflow and then into the return-flow, and from there a portion flows into the lower vessel, another portion being pumped back by means of a pump or the like into the upper vessel. The exact regulation of the excess pressure or the driving water column is attained by means of the overflow from the upper vessel to the lower. The source of heat can be arranged in the outflow, in the return-flow, or in the two open vessels—that is to say, at any desired position of the heating system.

In the accompanying diagrams the heating system according to this invention is illustrated.

Figure 1:
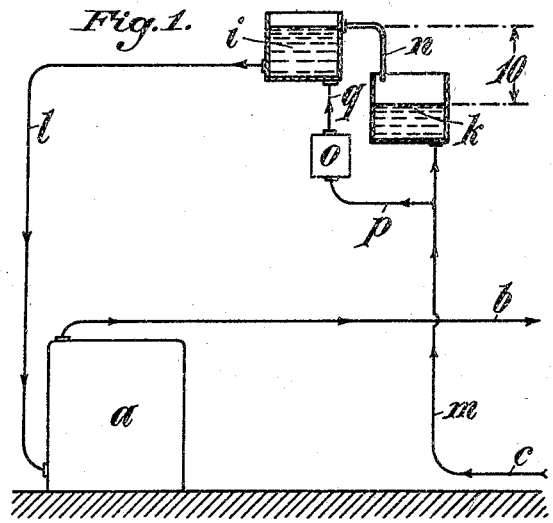
Figure 2:
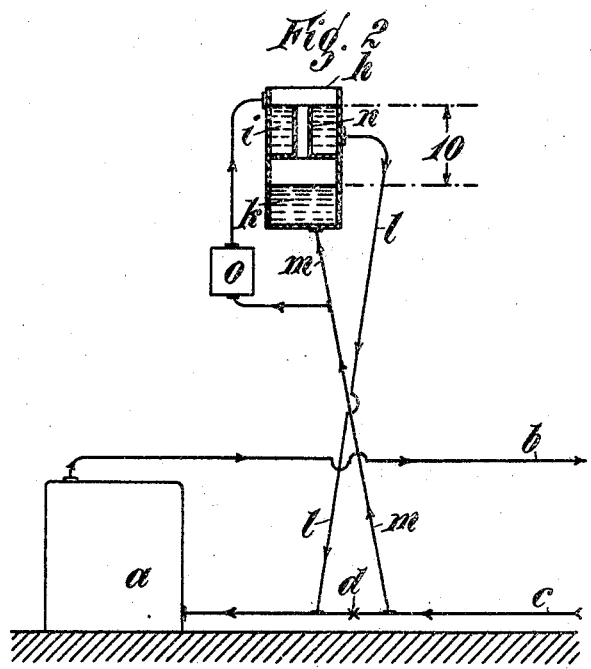

Figure 1 shows the simplest form. Fig. 2 is a modification with a variation in the arrangement of the two vessels, standing one above the other, and of the pipes leading to these. Fig. 3 shows a further modification of the arrangement shown in Fig. 2, a low-pressure boiler being the source of circulation for the water-raising device and the source of heat for the preheater, while a hot-water boiler is employed as a further source of heat. Fig. 4 is another view of the low-pressure boiler shown in Fig. 3. Fig. 5 is a section, drawn to an enlarged scale, through the two vessels in communication with a low-pressure-steam water-raiser. Fig. 6 shows the low-pressure-steam water-raiser (pulsometer) in section. Fig. 7 shows the arrangement of the heating system when steam is used as an accessory in the system, and therefore no low-pressure boiler is necessary as a source of circulation and heat. Fig. 8 illustrates the new heating system constructed as a flat-heating system in which the radiators stand at the same height as the boiler and only one low-pressure steam-boiler is used with a preheater, so that there is no hot-water boiler.

Referring to Fig. 1, above the heating system there are two open vessels $i$ and $k$ instead of the expansion vessel hitherto used. The hot-water boiler $a$, which serves as the source of heat for the hot-water heating and whose position may be any desired, is in this case inserted in the outflow, so that the latter is divided into two parts—namely, into the pipe $l$, which leads from the upper vessel $i$ to the hot-water boiler $a$, and the lead $b$, to which the radiators are connected. The outflow begins, therefore, from the upper vessel $i$ and passes through the source of heat to the radiators. The return-flow $c$ from the latter is conveyed by a pipe $m$ to the second lower vessel $k$. By means of pipes $p$ and $q$ and a pump $o$ the two vessels $i$ and $k$ are connected together, and there is also an overflow-pipe $n$ leading from the vessel $i$ to the vessel $k$. When this heating system is filled with water, the latter attains a certain height in the lower vessel $k$, and the pump $o$ is set in action, so that the water coming from the return-pipe $m$ or from the lower vessels $k$ is raised to the upper vessel, a circulation is set up in the heating system, and the head of water 10 measured by the distance between the two water-levels in the vessels $i$ and $k$ is limited by the overflow-pipe $n$. From the upper vessel $i$ the water flows, therefore, with the available pressure represented by the head 10 into the source of heat $a$, whence it passes through the radiators into the return-pipe $c$, the pipe $m$, and the lower vessel $k$, being finally brought back to the upper vessel $i$ by the pump $o$. Should the pump $o$ raise too much water, the excess flows directly through the overflow-pipe $n$ into the lower vessel $k$, so that the head of water 10 is accurately limited and may be fixed.

In the arrangement shown in Fig. 2 the two vessels $i$ and $k$ constitute a container $h$, divided by a horizontal partition. The overflow-pipe $n$ passes through or rises from this partition. The connection with the source of heat and the return-flow is also differently arranged. The return-pipe $c$ is brought back to the source of heat $a$, and in this pipe is a valve or the like $d$. At a point between this valve $d$ and the boiler $a$ the pipe $l$, leading from the upper vessel, joins the return-pipe, while on the other side of this valve the pipe $m$ leads from the return-pipe to the lower vessel, so that when the valve $d$ is closed the source of energy lies in the outflow, which starts from the upper vessel $i$. The advantage of this arrangement is that when the valve $d$ is open and the pump $o$ is not at work the heating system can be worked as an ordinary hot-water system, since then the circulation begins at the source of heat. In this case it is necessary, of course, that the level of the radiators relatively to the boiler should be such as to allow a natural flow of hot water due to the difference of temperature of the water columns in the outflow and return.

As already stated, Fig. 3 shows the whole arrangement of this new heating system with a low-pressure steam-boiler $e$ as the source of energy for the water-raising device and as the source of heat for the preheater $g$. There is also a hot-water boiler $a$ as a further source of heat. This arrangement is advantageous when the demand on the heating system varies, for when the demand is small the low-pressure steam-boiler $e$ suffices as the source of heat, while when the demand is greater the hot-water boiler $a$ can be brought into use. The steam-boiler $e$ is in this case preferably a sectional boiler with comparatively small steam and water chambers and with the necessary regulation of combustion, so that its evaporative power may be exactly regulated and the necessary steam-pressure can be kept constant.

The steam-boiler $e$, as is shown in Fig. 4, may be provided with a cylindrical vessel $f$, connected at its upper part by the pipe 20 with the steam-space and at its lower part by the pipe 21 with the water-space of the boiler in order to enlarge these two spaces. In the steam-space of this cylindrical vessel $f$ is situated a preheater $g$, containing a single pipe 4, into which opens on the one side a pipe $l$, coming from the upper vessel $i$ or a branch thereof, so that the hot water coming from the vessel $i$ passes through this preheater surrounded with steam and is thus preheated before it passes through the pipe 4 to the part $b$ of the outflow which leads to the radiators. The preheater $g$ cannot in this case be cut off; but the heating of the hot water can be regulated by adjustment of a three-way cock 2 into such a position that only part of the hot water passes through the preheater, while the remainder passes through a by-pass 3 directly to the outflow-pipe $b$ and there mixes with the water coming from the preheater through the pipe 4.

In Fig. 5 the two vessels $i$ and $k$ are shown in vertical section, drawn to an enlarged scale. The pulsometer $o$, serving to lift the water, (shown in section by way of example in diagram 6, the air-inlets not being shown,) is placed at such a level below the lower vessel $k$ that its chambers are automatically filled with water. By admission of the necessary steam-pressure the water from each pulsometer-chamber is separately forced into the upper vessel $i$, where it flows freely over the highest water-level.

The process of lifting the water is as follows: The water flows from the lower vessel $k$, through the pipe $p$, into the two chambers of the pulsometer. When the steam which passes from the low-pressure steam-boiler $e$, through the pipe $r$, to a chamber controlled by a ball-valve $s$ or some other kind of valve has a higher pressure than that of the water-column in the pipe $q$, the water from this particular pulsometer-chamber will be forced up the said pipe $q$ until its level reaches the lower edge of the pipe, which is the so-called "condensation-line." When this line is reached, there occurs, as in every pulsometer, a rapid condensation of the steam with formation of a vacuum, so that the ball-valve is turned over and the steam enters into the second chamber and forces the water therefrom, while the first chamber is again filled through the pipe $p$. While the steam is driving over the water the latter is at the same time heated by the steam, so that when the demand on the radiators is small this heating may alone be sufficient. The control of the pulsometer $o$ is arranged as hitherto usual, only the steam-passages are made wide to correspond with the low steam-pressure here used, and if any ball-valve is used the ball may be proportionately light. The pipe $p$ opens into each pulsometer-chamber at such a height above the bottom thereof that the contents of the chamber cannot be driven back through the pipe $p$. The water is only forced back in the pipe $p$ itself correspondingly with the steam-pressure, which may be accurately adjusted by a regulator in the low-pressure steam-boiler. The pipes $p$ and $q$ of the pulsometer have therefore no valves which very much diminish the efficiency with low-pressure steam and do not close tightly when the hot water contains impurities. For working the pulsometer there is necessary only steam having a pressure in excess of that corresponding with the water-column in the pipe $q$ and smaller than the water-column of the height between the exit of the pipe $p$ and the water-level in the vessel $k$. When high steam-pressures are used, this last-named water-column is inconveniently long, and then it is advantageous to use a pulsometer with check-valves.

With ordinary working the water-lifter must be of such power that it not only raises all the water which flows back to the lower vessel $k$ from the radiators, but also produces the driving-head 10—that is to say, it must have such an excess of water that the latter flows back through an overflow. This constant excess, which must be the greater the more radiators are cut out, can at the same time be used to regulate the amount of water lifted by the water-lifter, so that it is unnecessary to lift much more water than can flow through the heating system. Instead of the aforesaid overflow $n$, or somewhat lower than this, an overflow 5 can be arranged which leads into a bell-shaped vessel $z$ of a known kind. This vessel is suspended in a second vessel $y$ and is connected, through a suitable lever $w$, with a throttle-valve 6 in the steam-pipe of the water-lifter $o$.

In the bottom of the vessel $z$ there is an opening $z'$, which when the working is normal allows the overflow-water to pass into the vessel $y$, whence it passes from the pipe $z$ to the lower vessel $k$. If, however, the circulation of water is diminished by the cutting out of radiators in the system the water-lifter will raise too much water and more flows through the overflow 5 into the vessel $z$ than can pass away from the opening $z'$ in the bottom thereof. The vessel $z$ therefore becomes full and sinking by reason of its weight adjusts the throttle-valve 6 of the water-lifter $o$, thus diminishing the amount of steam which has access to the latter, and therefore the amount of hot water lifted.

The water-level in the lower vessel $k$ will in the course of working of the water-lifter $o$ rise as the working steam will be added to the hot water in the form of condensation-water. Moreover, the vessel $k$ at the beginning may be filled too full, thus diminishing the desired driving-head 10. To avoid this, there is arranged in the upper vessel at substantially the same level as the overflow 5 a further overflow $t$, provided with a valve $x$, which is moved by means of a float $u$ in the lower vessel. The float opens the valve $x$ when the driving water-level in $k$ is exceeded, and in normal working there then flows through $x$ so much water, which is therefore separated from the heating system, that the prearranged driving-head 10 is again established. The water flowing away through this overflow $t$ is advantageously returned to the steam-boiler $e$ through a pipe $v$ to serve as feed-water.

In the hereinbefore-described arrangement the water-lifter $o$ forms an almost direct connection between the two vessels $i$ and $k$. Instead of this, or in combination therewith, a pump or the like may be introduced at any desired position in the pipes where it may be operated, so that the driving-head 10 is produced, which is controlled by the overflows $t$ and $n$ or 5, as well as the float $u$. Moreover, in normal working the pump should force into the upper vessel $i$ so much water in excess of that needed for heating that this excess overflows if the normal excessive pressure exists in the system. The vessel $z$ can in this case also control the operation of the pump, since when the latter is raising too much water and the overflow increases the vessel $z$ would become heavier and will sink, and this movement can be transmitted in any known manner to the pump control, so as to diminish the volume of delivery of the latter.

In the arrangement shown in Fig. 7 the boiler is not shown; but it is supposed that steam from such a suitable source thereof is led to the system from a distance. As a source of heat there is used in this case a preheater consisting of several steam-pipes $g$, the operation being substantially the same as already described.

Fig. 8 shows diagrammatically the arrangement of the new heating system for heating flats, wherein a low-pressure steam-boiler with a preheater is arranged as the source of circulation and of heat, so that no hot-water boiler is necessary, and, moreover, outflow and return pipes are led in part at a lower level than the boiler and radiators.

Having thus described the nature of my said invention and the best means I know of carrying the same into practical effect, I claim—

1. In a hot-water heating system, two open water vessels situated above the highest point of the heating system, the one vessel being at a higher level than the other, an outflow system in connection with the upper vessel, a return system in connection with the lower vessel, and a water-lifter situated in the system for raising the water from the said lower vessel into the said upper vessel.

2. In a hot-water heating system, two open water vessels situated above the heating system, the one vessel being at a higher level than the other, a source of heat connected with the upper vessel, a return system connected with the lower vessel, a pump situated in the system for raising the water from the lower vessel to the upper one, and radiators connected with the return system and the lower vessel in such a manner that the water pumped from the lower vessel into the upper vessel flows from the latter to the source of heat, and thence from the radiators to the return system.

3. In a hot-water heating system, two open water vessels situated above the heating system, the one vessel being at a higher level than the other, an outflow system, a return system, a source of heat connected with the return system, a valve situated in the return system, a pipe leading to the return system from the upper vessel at a point between the said valve and the said source of heat, and a pipe leading to the lower vessel from the return system at a point therein farther from the source of heat than is the said valve.

4. In a hot-water heating system, two open water vessels situated above the heating system, the one vessel being at a higher level than the other, a water-lifter situated in the system and an overflow between the said upper vessel and the said lower vessel.

5. In a hot-water heating system, two open water vessels situated above the heating system, the one vessel being at a higher level than the other, a water-lifter in the system, an overflow in the said upper vessel, a suspended vessel into which the said overflow opens at a higher level than the working water-level in the said lower vessel, a lever adapted to be operated by the said suspended vessel, a source of steam, a pipe leading from the said source of steam to the said water-lifter, and a valve in the said pipe adapted to be operated by the said lever.

6. In a hot-water heating system, two open water vessels situated above the heating system, the one vessel being at a higher level than the other, an overflow in the said upper vessel, a valve closing the said overflow and a float connected with the said valve and situated in the said lower vessel.

7. In a hot-water heating system, two open water vessels situated above the heating system, the one vessel being at a higher level than the other, and a pulsometer arranged to lift water from the lower vessel into the upper vessel while at the same time warming the said water.

In testimony whereof I have signed my name to this specification in the presence of two subscribing witnesses.

HEINRICH ATHANASIUS BÖLZE.

Witnesses:
LEONORE RUSCH,
HERMINE GÖDECKE.